United States Patent [19]

Van Auwelaer et al.

[11] 4,332,126
[45] Jun. 1, 1982

[54] AUTOMATIC HEIGHT CONTROL FOR A HARVESTER HEADER

[75] Inventors: James M. Van Auwelaer, Coal Valley; Eugene B. Hutchinson; Jerome A. Braet, both of East Moline, all of Ill.

[73] Assignee: Deere & Company, Moline, Ill.

[21] Appl. No.: 186,073

[22] Filed: Sep. 11, 1980

[51] Int. Cl.$^3$ .............................................. A01D 67/00
[52] U.S. Cl. ..................................... 56/10.2; 56/208; 56/DIG. 15
[58] Field of Search ....................... 56/10.2, 10.4, 208, 56/DIG. 15

[56] References Cited

U.S. PATENT DOCUMENTS

| | | | |
|---|---|---|---|
| 3,698,164 | 10/1972 | Boone et al. | 56/10.4 |
| 3,722,193 | 3/1973 | Strubbe | 56/208 |
| 3,728,851 | 4/1973 | Van Antwerp | 56/208 |
| 3,851,451 | 12/1974 | Agness et al. | 56/10.2 |
| 4,136,508 | 1/1979 | Coleman et al. | 56/208 |
| 4,171,606 | 10/1979 | Ziegler et al. | 56/10.2 |

Primary Examiner—Jay N. Eskovitz

[57] ABSTRACT

A self-propelled combine harvester is equipped with a grain cutting platform having a floating, flexible cutter bar. The operating height of the grain platform is controlled conventionally by hydraulic cylinders. An automatic operating mode may be chosen in which the hydraulic cylinders are responsive to a signal corresponding to vertical disposition of the floating cutter bar relative to the floor of the platform. The automatic control system includes a sealed self-contained position sensor switch module directly coupled to a sensor rock shaft whose rotational position in the platform frame is representative of the disposition of the cutter bar relative to the platform floor. The sensor switch module includes a segmented printed circuit board and an associated wiper arm with a brush assembly, directly coupled to the sensor shaft. Selector switching means includes a rotary switch at the operator station which the operator can set to control the platform at any one of three operating height set points. A mechanical float range indicator is optionally provided.

25 Claims, 11 Drawing Figures

| | | | SELECTOR SWITCH POSITION | | | |
|---|---|---|---|---|---|---|
| | | | A | B | C | D |
| OUTPUT CONTACT CONNECTABILITY | COMMITTED CONTACT | 108 | 0 | ↑ | ↑ | ↑ |
| | UNCOMMITTED CONTACTS | 102 | 0 | 0 | ↑ | ↑ |
| | | 104 | 0 | ↓ | 0 | ↑ |
| | | 106 | 0 | ↓ | ↓ | 0 |
| | COMMITTED CONTACT | 110 | 0 | ↓ | ↓ | ↓ |
| OPERATING HEIGHT SET POINT RANGE (INCHES-OFFSET) | | | OFF | ½/1½ | 1½/2½ | 2½/3½ |

0 - OFF (DEAD)
↑ - RAISE
↓ - LOWER

AUTOMATIC HEIGHT CONTROL FOR A HARVESTER HEADER

BACKGROUND OF THE INVENTION

The present invention relates generally to control of the operating height of a header of a mobile harvester and more particularly to automatic height control, responsive to a groundengaging feeler or follower, of a forward gathering portion of the header.

For convenience, discussion and description of the invention and the embodiment shown in the drawings will be limited to its application to a self-propelled combine harvester. It will be clear that the invention may be applied appropriately to other machines where there is a need to control automatically, movement and relative position of one functional element with respect to another, including the headers of tractor-drawn and tractor-mounted harvesters.

Automatic header height control systems are well known and are in wide commercial use in a number of forms. In harvesting certain crops, it is desirable to keep the crop gathering unit close to the ground to minimize losses. To maintain a selected gatherer-to-ground relationship by manual control is difficult and fatiguing. Automatic controls relieve the operator and, at least potentially, maintain a selected operating height more reliably and constantly.

Typically, one or more ground following feelers beneath the crop gathering unit are connected to the controls for a hydraulic or other power lift system so as to signal changes in operating height, with the power lift system responding accordingly. Automatic height controls may be applied to a "rigid" header in which the crop gatherer unit, possibly including a cutter bar, forms part of a rigid assembly, including a feeder house for delivery of crop to the combine body, the whole header being pivoted to the body for vertical movement pivoting about a transverse horizontal axis and controlled by the power lift system. In other arrangements, the crop gathering unit may have a forward floating portion such as a flexible cutter bar which rides on the field surface, header height being controlled automatically, responsive to the vertical disposition of the floating portion of the gatherer relative to the main portion or frame of the crop gathering unit. Another example of a gathering unit with a "forward floating portion" and where automatic height control is advantageous is a row crop harvesting header of the type disclosed in U.S. Pat. No. 3,808,783, Sutherland et al, also assigned to the assignee of the present invention.

Automatic height control systems now in use or proposed tend to be either somewhat crude and inherently unreliable or too sophisticated and complex to be commercially attractive. The simpler systems typically use cumbersome linkages to transmit relative movement from the ground follower or feeler to an actuator between a pair of limit switches which are necessarily exposed, at least partially, to possible mechanical damage and dust contamination. Selection of relative operating height set point is made by adjusting the linkage and/or repositioning the switches. A proposal to make selection of operating height set point more convenient involves the use of additional limit switches, each positioned to correspond to a particular operating height set point and electrical circuitry for selecting which limit switch is to be operative, but this system is also mechanically relatively complex and vulnerable in many harvesting environments. Other electronically or electrically more sophisticated systems have been proposed, including one in which each of a plurality of ground followers or feelers spaced across a transversely extending crop gathering unit is directly connected with a position switch or has an integral position switch at its pivot point with the gatherer frame. In combination with appropriate circuitry this provides the possibility of control modes other than the simple control mode inherent in the systems referred to above. However, the practicality and commercial feasibility of such systems must be questioned.

It is also known in a crop gatherer unit having a floating element, such as a cutter bar or row unit, to provide a mechanically actuated range indicator visible to the combine operator and representative of the vertical disposition of the floating element relative to the fixed portion of the gatherer.

SUMMARY OF THE INVENTION

It is an object of the present invention to provide an automatic height control system for the crop gatherer unit of a harvester which is reliable, simple and low in cost, including a position sensor switch module having a minimum number of parts, easy to assemble and maintain, and convenient for an operator to control and adjust.

According to the invention, there may be combined with a harvester header having a crop gathering unit carried on the harvester body and provided with power lift system, such as an electro-hydraulic system for moving the header to control the height of the crop gathering unit above the ground, automatic control means for the power lift including a position sensor switch which may be directly coupled to a movable sensor element carried by the gatherer frame and whose position in the frame is representative of the height of the gatherer above the ground, responsive to a ground-following element. According to the invention, the switch includes a common or input contact connectible to an electrical power source serving the lift system and a plurality of output contacts connectible through switching means, including a manual selector switch, to portions of the power lift system effective to raise or lower the header and hence the crop gatherer unit, and a wiper arm coupled to and driven by the sensor element, including a connecting brush assembly for slidingly engaging the contacts and completing an electrical connection between the common input contact and at least one of the output contacts as the wiper arm moves.

Preferably, the position sensor switch is a self-contained unit or module comprising a dust-proof and moisture-resistant box enclosing the electrical contacts and wiper arm and brush assembly. The wiper arm assembly is preferably pivotally journaled in a bearing substantially sealed against the entry of foreign material or contaminants, carried in a wall of a box and extending through the wall in a form to facilitate direct coupling, externally of this box, of the wiper arm assembly with a rotatable sensor element. The box may thus be positioned by the rotatable sensor element, at least in a plane perpendicular to its axis of rotation but held against rotation through engagement with the frame of the crop gathering unit and be readily pre-assembled and installed on the gatherer as a sealed unit.

According to the invention the contacts may be provided in the form of a segmented printed circuit board with the contacts lying in a plane perpendicular to the pivot axis of the wiper arm and with each contact connected to the terminals of a dust-proof connector socket closely fitting and extending through a wall of the box for external connection to a selector switching means by a suitable mating connector and wiring harness.

Electro-hydraulic power lift for positioning the crop gathering unit vertically relative to the ground (and, of course, relative to the harvester body) include raise and lower portions, operable responsive to an electrical signal to raise or lower the unit. The selector switching means may include a manual selector switch for selectively and simultaneously making connectible at least one contact to the raise portion and one to the lower portion so that the lift system is correspondingly signalled and actuated according to movement of the rotatable sensor element and hence of the wiper arm assembly, the space between said contacts establishing a "dead band" corresponding to a particular selected operating height range. Sensed movement of the crop gathering unit outside of this range results in a signal from the position sensor switch to the raise or lower portion respectively of the lift system to restore the gatherer into the desired height relationship. In a preferred arrangement, switching is provided so that in a group of spaced side-by-side output contacts, a selected contact remains "dead" while the remaining contacts, flanking it on its opposite sides, are connected respectively to the raise and lower portions of the lift system. The spacing between the contacts and the width of the connecting brush element of the wiper arm assembly may be such that the brush element straddles the gap between contacts so that as the wiper arm moves over the contacts there is substantially no interruption of electrical connection between the output contacts and the common input contact. The grouping of a plurality of contacts may include intermediate uncommitted output contacts, any one of which may selectively become the "dead" contact (establishing a selected dead band and operating height set point) and, at the extremes of the group, committed contacts of greater extent, connectible respectively only to the raise and lower portions of the power lift system. The greater extent of the committed end contacts provides accommodation for variations in manufacture and for the adjustment, on installation, of the position sensor switch module relative to the gatherer frame. In any one selector switch setting, all contacts on both sides of the dead band remain effective so that appropriate lift system response is maintained even during wide fluctuations of the rotatable sensor element, for example due to a rough field surface.

In keeping with the invention, a mechanical height range indicator, also connected to and driven by the rotatable sensor element may optionally be provided and used in conjunction with an automatic gatherer height control having provision for operating selectively at any one of a plurality of control height set points. It may be arranged that the calibrated scale of such an indicator is disposed on the gatherer unit within the general field of vision which the operator monitors during harvesting operation so that he has a constant and convenient reference of the selected operating height set point. Although a multiposition switch for selecting operating height set point may be located at the operator station and provided with appropriate position or range markings, the operator can, by referring to the scale of the mechanical range indicator, quickly ascertain which operating height set point has been chosen within the total float range of the ground-following element and what options remain available to him to make desirable or necessary corrections, up or down, without interrupting his monitoring of gatherer function, say in difficult harvesting conditions, by transferring his attention to observe the setting of the switch at the operator station.

DESCRIPTION OF THE PREFERRED EMBODIMENT

Figure 1:
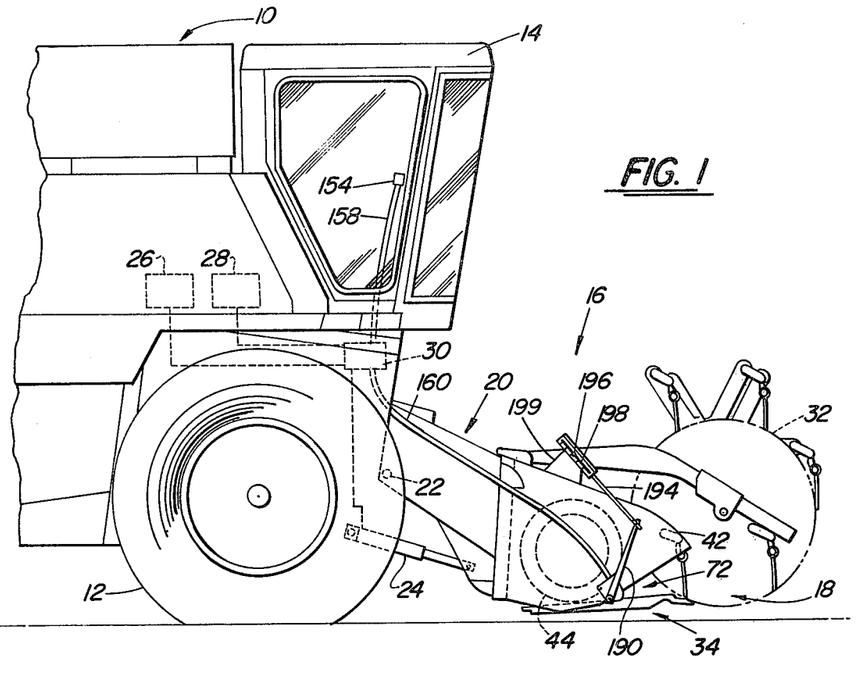
FIG. 1 is a right-hand side elevation of a forward portion of a combine carrying a header with a crop gathering unit embodying the invention.

The invention is embodied in a self-propelled combine harvester, the forward portion of which is shown in FIG. 1. A mobile body 10 is supported above the ground on a pair of forward drive wheels 12, and includes a forward operator station 14 and carries a forward mounted header 16.

In this embodiment, a forward crop gatherer unit is exemplified by a grain cutting platform 18 rigidly attached to a feeder house 20, and forming part of the header 16 which is coupled to a combine body 10 for pivoting about a transverse pivot axis 22. Vertical movement of the header 16 is controlled by a pair of side-by-side hydraulic cylinders 24 actuation of which is dependent upon sources of hydraulic and electrical power 26 and 28, respectively, and an electro-hydraulic control assembly 30, all carried in the combine body 10 and shown only in simplified diagrammatic form in FIG. 1.

Figure 2:
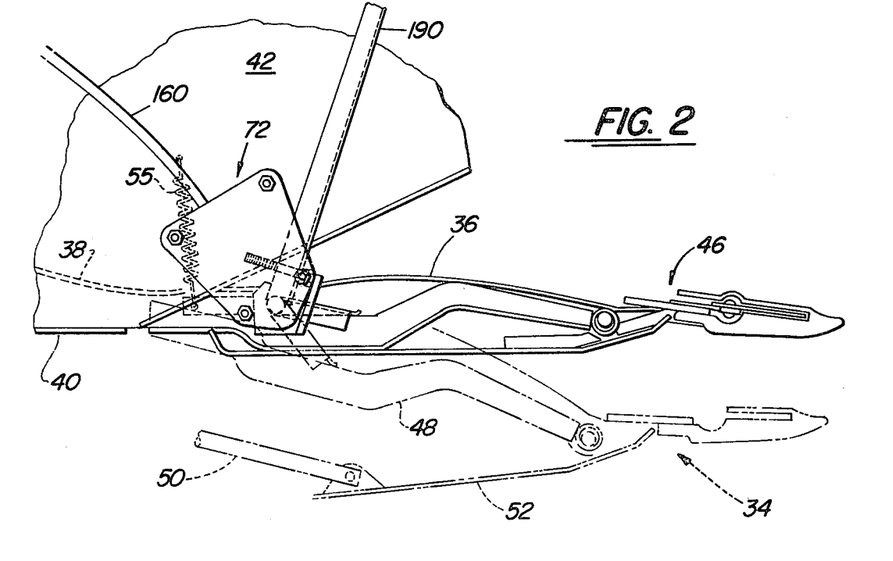
FIG. 2 is an enlarged partial side (or end) view of the crop gatherer unit showing semi-schematically the response of the transverse rock shaft of the automatic height control sensor to floating action of the flexible cutter bar.

Looking at the gathering unit cutting platform 18 in more detail and referring particularly to FIGS. 1 and 2, the structure is generally conventional except for the provisions for the automatic height control device of the present invention. An adjustable gatherer reel 32 helps to control the standing crop for engagement by a conventional floating flexible cutter bar 34 as the combine advances over a field. Severed crop passes rearward over a transition plate 36 to a fixed floor portion 38, the body or main portion of the gatherer unit 18 being given rigidly by a gatherer frame, a representative portion of which is indicated by the numeral 40. Opposite end sheets 42 provide support for a platform auger 44 which converges crop material to the center of the platform for reception by the feeder house 20 and delivery for processing to the combine body 10.

The form and function of floating flexible cutter bars is well known and that of the cutter bar 34 of the present embodiment will be described only briefly. More complete descriptions are available elsewhere, for example, in U.S. Pat. No. 3,982,383 Mott, also assigned to the assignee of the present invention. Crop is severed by the knife 46 which is floatingly carried for vertical movement relative to the gatherer floor 38 by a linkage system including a plurality of transversely spaced stop arms 48 and push links 50. A series of side-by-side, ground-engaging skid shoes 52 serve as feelers or ground followers and provide the external input for determining a fluctuating vertical offset between the adjacent portion of the knife 46 and the platform floor 38 as the combine advances.

Figure 3:
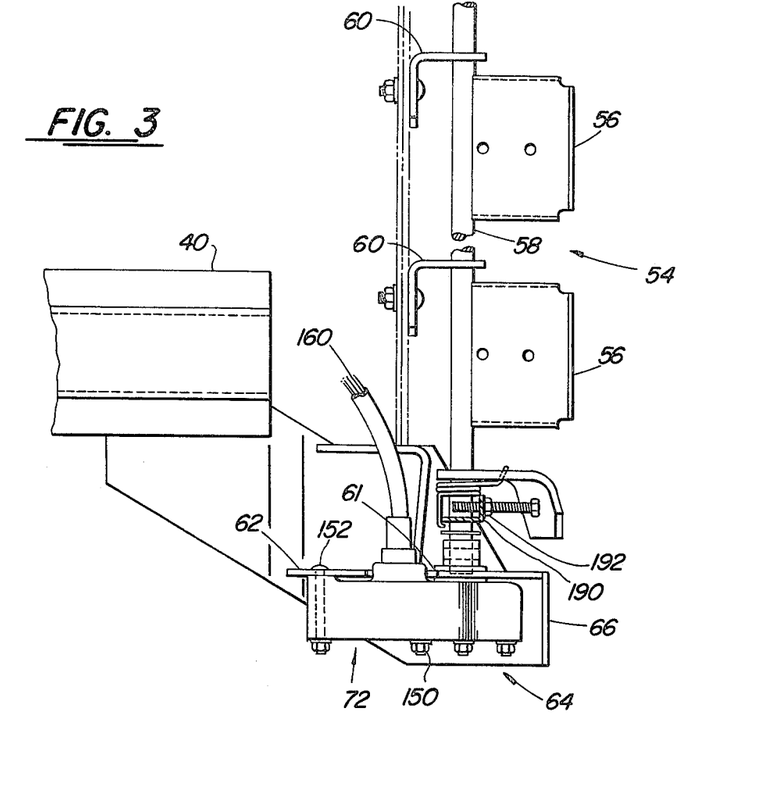
FIG. 3 is an enlarged partial overhead view of the righthand end of a portion of the crop gatherer unit showing the connection of the position sensor switch module and the range indicator drive arm to the height sensor rock shaft.
Figure 4:
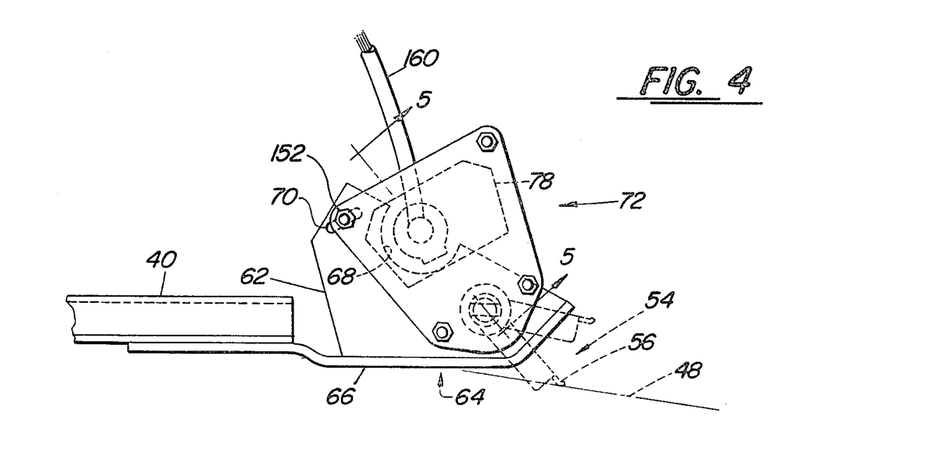
FIG. 4 is a further enlarged partial view similar to FIG. 2 showing the mounting and disposition of the position sensor switch module in more detail.

The rotational position, relative to the fixed portion of the gatherer or gatherer frame 40, of a rotatable sensor element, sensing shaft assembly 54, seen best in FIGS. 3 and 4, is representative of the vertical offset of the knife 46 relative to the platform 38. The sensor shaft assembly 54 includes a plurality of transversely spaced pads 56 rigidly attached to a shaft 58, the shaft 58 being journaled in brackets 60 rigidly attached to the gatherer frame. The sensing shaft assembly 54 is biased by a tension spring 55 so that the sensor pads 56 bear on the stop arms 48. In that the pads 56 are rigidly attached to the shaft 58, the shaft position and hence the signal which it originates will be determined at any one time by the uppermost of the stop arms 48 responsive to engagement by one or more of the skid shoes 52 with a portion of the ground, or field surface, relatively higher than that engaged by any of the other skid shoes 52. The outer or right-hand end of the sensor shaft 58 is aligned with a pilot hole 61 in the vertical fore-and-aft oriented support wall 62 of a support bracket assembly 64 which is rigidly attached to the gatherer frame 40 by a skid-like lower member 66. The upper edge of the wall 62 is provided with a notch 68 and the rear upper corner with a slot 70.

Figure 5:
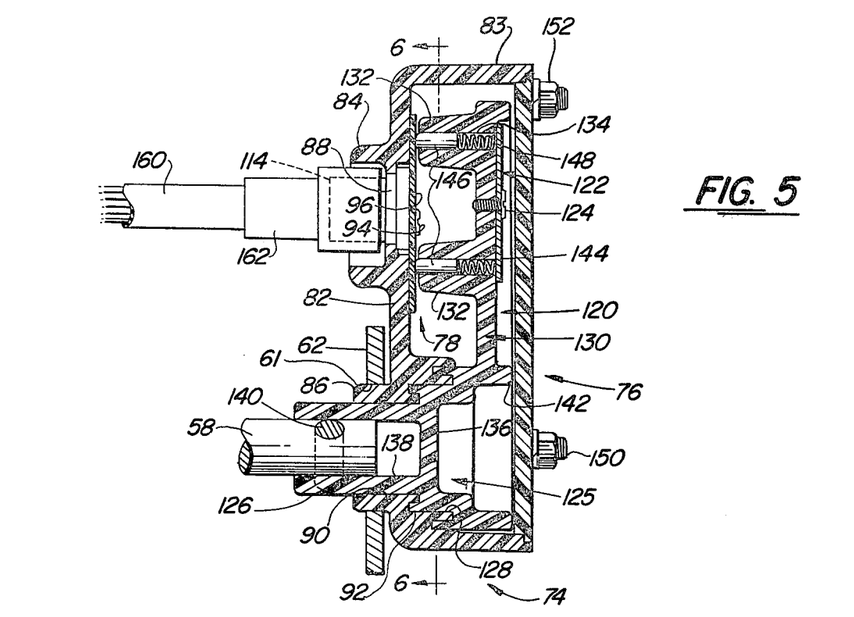
FIG. 5 is a still further enlarged cross-sectional view of the position sensor switch module taken approximately on 5—5 of FIG. 4 and showing the electrical and mechanical (sensor rock shaft) connections to the switch assembly.

The header position sensor switch module 72, supported adjacent and partially shielded on its forward and lower sides, by bracket 64, is made up of a box or body portion 74, closed by a cover 76 and housing a circuit board assembly 78 and wiper arm assembly 80.

The box 74 includes an inner wall or floor and a continuous side wall 83. In assembly, the box inner wall 82 lies closely parallel to the mounting bracket wall 62 and includes bosses 84 and 86, respectively, partially defining a connector socket opening 88 and a bearing bore 90. The boss 86 extends through and closely fits the pilot hole 61. Extending inwards from the box inner wall 82 is an annular labyrinth seal structure 92 integral with the wall 82 and concentric with the bearing bore 90.

Figure 6:
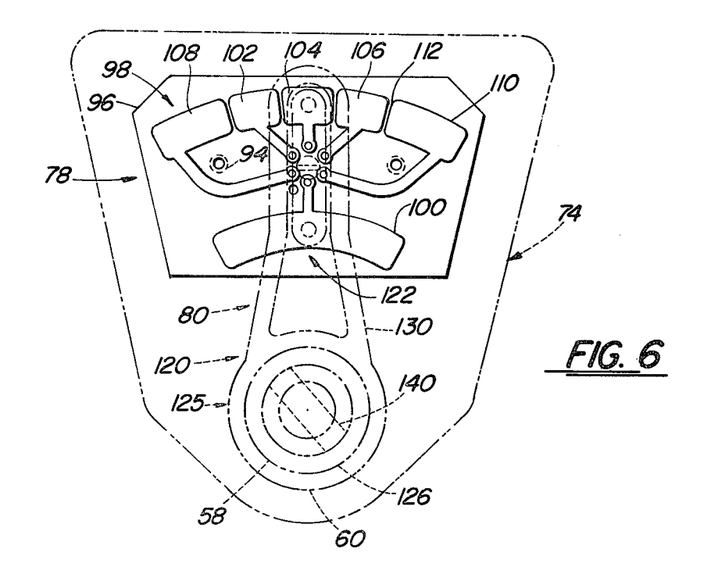
FIG. 6 is a view approximately on line 6—6 of FIG. 5 of the printed circuit board of the position sensor switch with the wiper arm assembly shown in phantom outline.

The circuit board assembly 78 is secured to the inner wall 82 by screws 94 so that it effectively covers the socket opening 88. The circuit board base plate 96 carries segmented contacts arranged in spaced arcs approximately concentric with the bearing bore 90 consisting of a group of output contacts 98 and a single common or input contact 100. The five output contacts include three adjacent contacts of similar size, 102, 104 and 106 and flanking them, at opposite ends of the group, contacts of greater circumferential extent, raise and lower segments, 108 and 110 respectively. Each output contact is separated from its neighbors by a narrow space 112. All of the contacts are connected in conventional manner to a connector assembly 114 extending through and closely fitting so as to seal the socket opening 88 of the inner wall 82.

The wiper arm assembly 80 consists of a one-piece arm 120 made from a structurally suitable insulating material and a brush assembly 122 secured to the arm by suitable means such as screw 124. The arm 120 includes a pivot or bearing portion 125 and is journaled in the bearing bore 90 of the body 74 on a hollow cylindrical bearing journal portion 126, extending through and beyond the bearing bore 90, and concentrically surrounded at its inner end by a labyrinth sealing structure 128, mating with the corresponding labyrinth structure 92 of the housing 74. A tapering web portion 130 of the arm extends radially from the bearing portion 125 and carries a pair of spaced brush bosses 132, each with a through bore 134 for receiving a brush and spaced radially from the bearing bore 90 so as to register respectively with the arcs of the common contact 100 and the group of output contacts 98.

The pivot or bearing portion 125 of the arm 120 is substantially hollow but is blanked off by an internal wall 136 defining in part an outwardly facing blind cylindrical hole or socket 138, concentric with the bearing journal 126. The socket 138 is a close fit on the end of the shaft 58 so that the position sensor switch module 72 may be coupled to the shaft 58 and rigidly secured to it by suitable fastening means such as the pin 140. The shaft 58 is free to float axially in its bearing brackets 60 so that it is located axially by its coupling with the journal portion 126 of the wiper arm.

At the opposite end of the pivot or bearing portion 125 of the arm 120 is an annular wall or thrust collar 142 concentric with the bearing journal 126 and extending somewhat beyond the surface of the web 130.

The brush assembly 122 is secured to the arm 120 by means of a screw 124 passing through an electrically conductive bridge portion 144 which lies, radially extending, on the surface of the web 130, carrying at its opposite ends a pair of suitable brushes 146, for example, of copper infiltrated graphite composition, engaging and biased against the respective contacts of the circuit board assembly 78 by springs 148. As is indicated in FIGS. 5 and 6, the brushes 146 are of such diameter that they may span the gap 112 between any of the neighboring contacts of the output contact group 98. The continuous sidewall 83 of the housing 74 is recessed at its outer edge to closely receive the cover 76, secured by suitable fasteners 150, such as those illustrated in the drawings, so as to complete a dustproof and weather resistant position sensor switch module which may be secured to and supported as a unit with the sensor shaft 58 by the pin 140. To hold the module against rotation, a somewhat longer fastener 152 releasably and adjustably engages the slot 70 in the wall 62 of the bracket 64.

Figure 10:
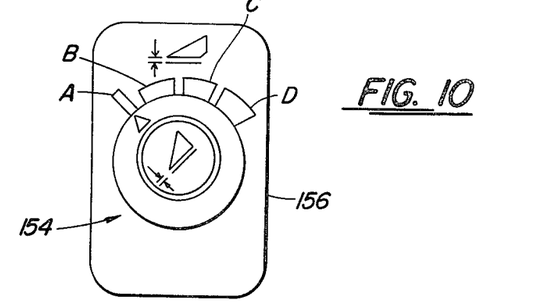
FIG. 10 shows diagrammatically the control knob of the rotary selector switch at the operator station and the function indicating decal associated with it.
Figure 11:
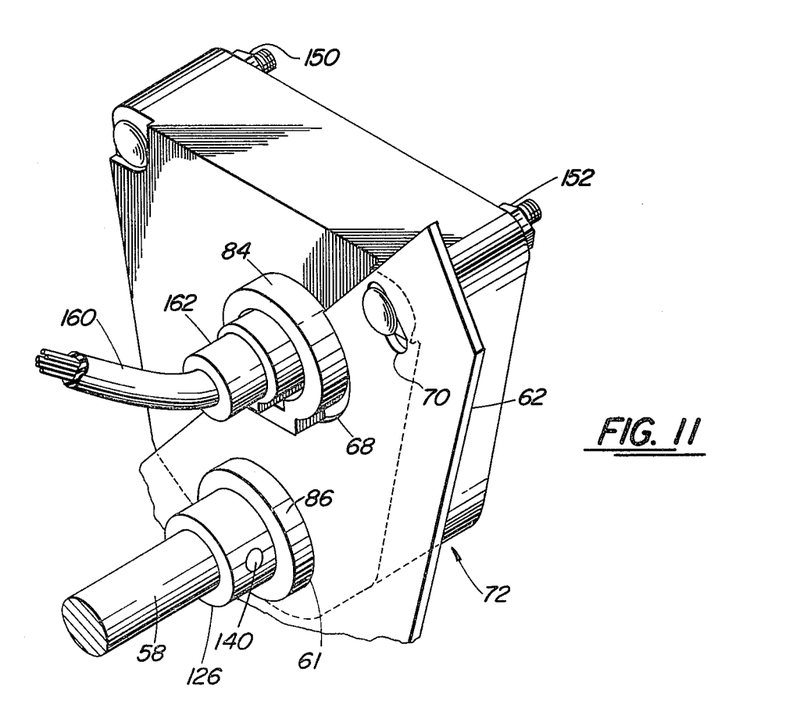
FIG. 11 is a left, rear three-quarter perspective view looking somewhat downward and showing the position sensor switch module and its mechanical and electrical connections.

Selection of operating height set point for the knife 46 of the cutter bar relative to the floor 38 of the platform is made from the operator station by means of a conventional three-pole four-position rotary selector switch 154, with its positions suitably labeled by a decal, indicated in FIG. 10, by the numeral 156, and connected to the electro-hydraulic control assembly 30 by a wiring harness 158. A second wiring harness 160 equipped with a socket connector 162 mating with the socket connector 114 of the circuit board 78 connects the electro-hydraulic control assembly 30 to the position sensor switch module 72.

Figures 7, 8:
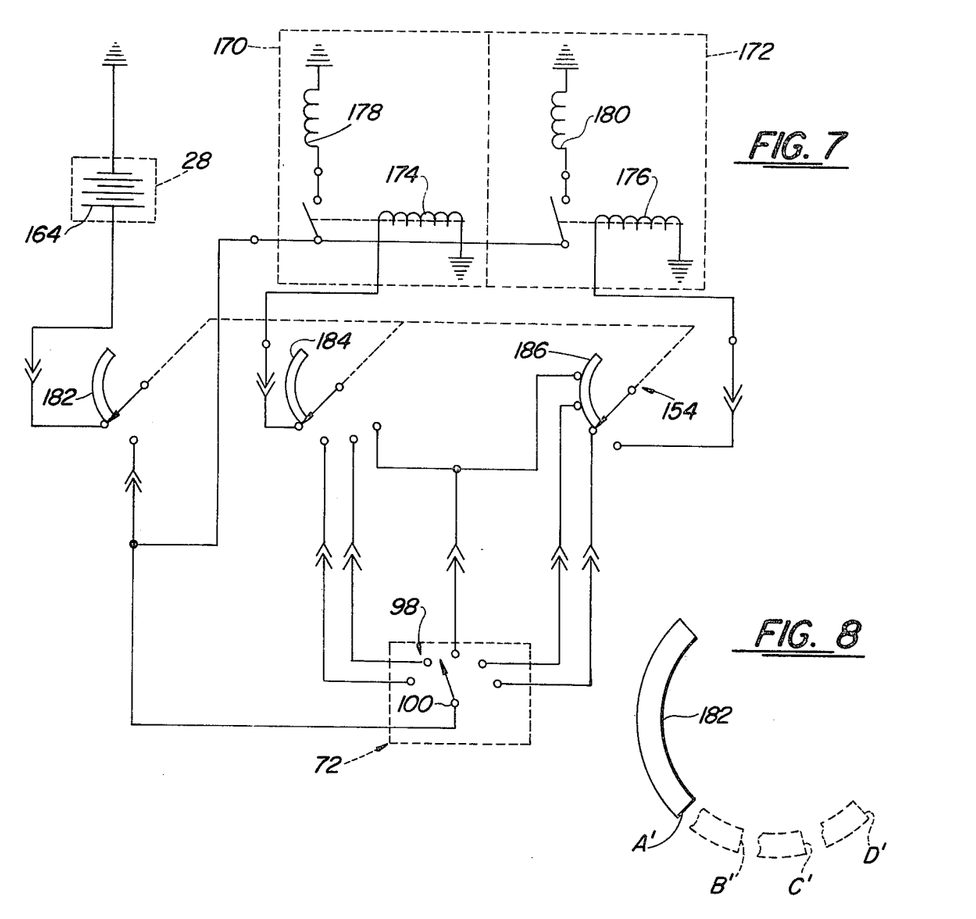
FIG. 7 is a simplified schematic of that part of the electrical circuitry of the combine concerned directly with automatic control of the operating height of the header.
FIG. 8 is a diagram representative of a wiper of one of the poles of the three pole four position rotary switch used for selecting operating height set point, shown in its off position and, in phantom outline, its disposition in each of its other three settings.

FIG. 7 represents a simplified schematic of that portion of the combine electrical system directly related to automatic control of the height or position of the header, responsive to the position of the floating cutter bar 34 relative to the gatherer platform floor 38. It includes the electrical power source 28 (which may, for example, include a battery 164), portions of the electrohydraulic control assembly 30, comprising a raise portion 170 and a lower portion 172, each, when suitably energized, causing the actuation of the hydraulic cylinders 24 respectively to raise or lower the header 16. The raise and lower portions 170, 172 each include switching relays, 174 raise and 176 lower, and solenoid valve coils, 178 raise and 180 lower.

As indicated in FIG. 10, the selector switch 154 provides an off position A, and three operating positions B, C, D, each corresponding to a particular operating height set point. The rotary selector switch 154 shown in FIG. 7 purely schematically, in "exploded" form, includes three, coupled together and concentric, wiper segments 182, 184, 186 (one for each pole of the switch). The relative position of each of the wiper segments corresponding to each of the four switch positions, A, B, C, D, is indicated pictorially in FIG. 8 by the letters A′, B′, C′, D′. The function performed by the switching relays 174, 176 and solenoid valve coils 178 and 180 respectively is conventional. In some applications, for faster response and higher reliability, it may be preferable to use an alternate conventional arrangement, for example with electronic switching.

Optionally a mechanical range indicator may be fitted and used in conjunction with the automatic height control system. Its input is an arm 190 adjustably coupled to the sensor shaft 58 by a torsionally resilient coupling 192 (as seen best in FIGS. 2 and 3) so as to move in unison with the wiper arm assembly 80 of the sensor switch module 72. A connecting rod 194 pivotally connected to the arm 190 carries at its free end an indicating ball 196 which rides in a channel-like calibrated scale member 198, supported adjacent the top of the right-hand side sheet 42 by a bracket 199 and visible to the combine operator. A mechanical range indicator of this type is described in more detail in U.S. Pat. No. 3,967,437, Mott et al, also assigned to the assignee of the present invention. As mentioned above, in the discussion of the cooperation of the transverse rock shaft assembly 54 with the stop arms 48, the rock shaft position and hence the indication of the ball 196 against the scale of the range indicator 198 will correspond to the relative position of the uppermost portion of the flexible cutter bar 34. In this exemplary embodiment, the total float range provided is about four inches measured at the knife 46, the upper and lower limits of the range being set or stopped mechanically as is conventional.

The electrical function of the position sensor switch module 72 is also indicated schematically in the circuit schematic of FIG. 7. The appropriate wiring connections between the terminals of the components of the system (provided at least in part by the wiring harnesses 158 and 160), are included but not specifically identified in the circuit schematic.

In operation, before advancing into a field of standing crop, the operator will have set the selector switch 154 at the operator station 14 for a given nominal operating height set point. Then by means of conventional and well-known control elements and circuitry (not shown or described here) he will lower the header 16 into the height range where it will become subject to automatic height control. On releasing his manual lift control switch or lever, the automatic system takes over. The wiper arm assembly 80, directly coupled to the sensor shaft 58, responds to the relative vertical floating of the floating cutter bar 34 to move the brushes 146 in relation to the contacts of the printed circuit board 78, sending signals to actuate the lift system to raise or lower the header as required to maintain the selected operating height.

As shown in the drawings and described above, the position sensor switch module 72 is a neat, compact package simply assembled to the machine, requiring only the insertion of one retaining pin (140) for coupling the drive, and the positioning of only one fastener, such as the fastener 152 shown, and making use of the slot 70, for initial adjustment of the module relative to the gatherer frame as required by manufacturing variations and/or synchronizing the sensor module with other moving components of the system.

The compact and self-contained nature of the module facilitates its direct coupling with a rotatable sensor element such as the shaft 58 in the present embodiment, but even though, as in this case, such direct mounting may result in its being placed in an area where it may be vulnerable to damage from crop material and other foreign bodies, it is easily guarded by a simple assembly such as the shield and bracket combination 64. Connecting of the module 72 into the system mechanically (by coupling it to the sensor shaft 58) and electrically (by making the connection of wiring harness 160 by means of the mating connectors 162 and 114) is done externally without the need for exposing and possibly damaging the internal portions of the module.

Careful choosing of the materials for the position sensor switch module components and then taking advantage of the properties of those materials has resulted in an effective and efficient combination with a minimum number of parts. Good results have been obtained with box, cover and wiper arm injection molded in a plastic material such as a mineral filled nylon. Using these materials the possible entry points for dust, moisture or other contaminants, namely, the apertures for electrical connection and for driving the wiper arm, as well as around the cover, can all be provided economically with the necessary close tolerance of dimension and surface finish to provide a high degree of sealing. In particular, an effective labyrinth-type seal at the rotational-motion junction between the wiper arm and the housing is provided by mating surfaces integral with the two components at relatively low cost. The annular thrust collar 142 of the wiper arm cooperates with the mating labyrinth seal portions to limit axial movement of the wiper arm assembly within the box so as to maintain a proper relationship between the brushes and the contacts of the printed circuit board of the module.

As noted above in describing the structure of the present embodiment, preferably the radially outward brush 146 is of sufficient diameter to straddle any one of the gaps 112 between any one of the neighboring contacts of the group of output contacts 98, so that as the brushes are carried across the contacts electrical continuity is maintained between the common or input contact 100 and the output contacts. Clearly with suitable selector switching means, this arrangement of contacts in a rotary sensor switch offers a variety of options for making the output contacts selectively connectable to the header lift system for a variety of modes of response. In the present embodiment we have chosen to provide only five output contacts and a selector switching arrangement providing three operating height set points. In this system the output contacts 98 are variously connectable to the raise or lower portions 170, 172, respectively, as determined by the position of the selector switch 154 at the operator station. The circuit chosen results in the end contacts 108, 110 being "committed" contacts in that they are connectable only to the raise and lower portions 170, 172, respectively, of the system. The three intermediate output contacts 102, 104, 106 have been made "uncommitted" in that they are all selectively connectable either to the raise or lower portions 170, 172, respectively, of the lift system, or "dead" (unconnected).

Figure 9:
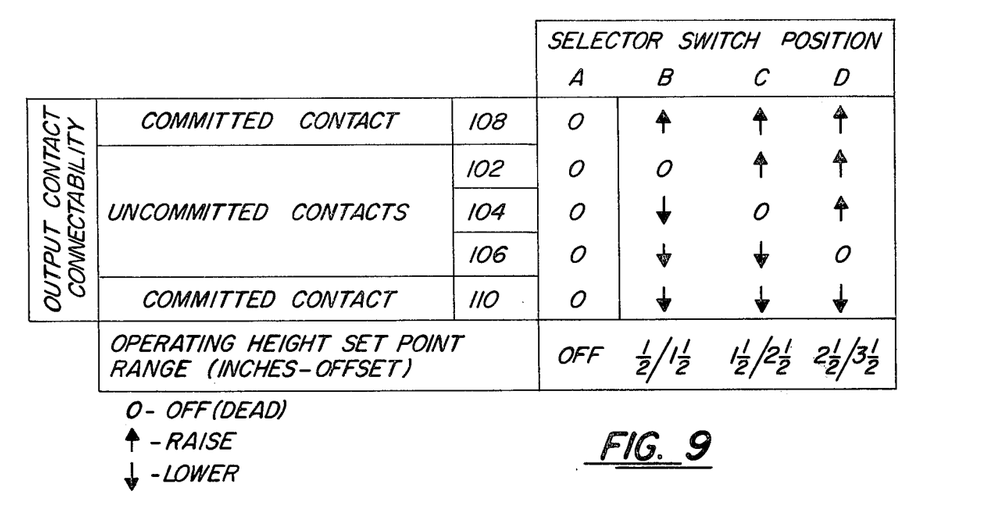
FIG. 9 is a table showing, for each position of the rotary selector switch, the condition of each segment or contact in the position sensor switch, in accordance with the circuit diagram of FIG. 7.

The connections (output terminal to lift system) corresponding to the four positions, A, B, C, D, of the rotary selector switch 154, are set out in tabular form in FIG. 9 and clearly follow from the arrangement shown in the electrical circuit schematic of FIG. 7. Each of the three wiper segments 182, 184, 186, corresponding to the three poles of the three-pole four-position rotary selector switch 154, have an effective arc of 90° and the switch indexing between each of its four positions is 30°. The terminals of the switch are, of course, also spaced at 30° intervals with the group of terminals timed appropriately as indicated in FIG. 7, where the switch is shown in position A, the off position.

In the present embodiment, in which the float range of the knife 46 relative to the platform floor portion 38 has upper and lower limits determined by the float linkage structure, the range indicator (calibrated in inches from 0 to 4) is adjusted by means of the adjustable connection 192, so that in the upper and lower limited float positions the indicator registers 0 and 4 respectively.

As indicated in Table 9, the dimensions chosen in this exemplary embodiment (including those of the contact segments, and particularly the output contacts), result in an effective dead band width equivalent to one inch of vertical float of the knife 46. By virtue of the close spacing of the committed contacts 102, 104 and 106 and the narrow gap 112 between them, as well as the dimensions of the radially outward brush 146, the system provides three contiguous dead bands (each equivalent to one inch of float) and, together, the three operating height set point positions B, C, D, provide automatic control continuously but selectively over an aggregate automatically controlled range of 3 inches. In the nominal centered or symmetrical position of components suggested by the drawings and indicated in the table (FIG. 9), this controlled range will fall in the middle of the total possible float range resulting in the nominal control ranges shown in the table, FIG. 9—$\frac{1}{2}$ to $1\frac{1}{2}$, $1\frac{1}{2}$ to $2\frac{1}{2}$, and $2\frac{1}{2}$ to $3\frac{1}{2}$ inches.

In particular crop or ground conditions, it may be desirable to provide automatic control closer to an end of the total float range, for example, near the upper limit of float (0), with the knife 46 at its minimum offset from the platform floor 38. The aggregate nominal controlled range may be shifted in the desired direction by loosening the fastener 152 in the slot 70 and swinging the switch module 72 so as to re-time appropriately the output contact group 98 with the wiper arm assembly 80.

It should be noted that while the automatic control is responsive to the uppermost portion of the cutter bar knife 46, other portions are free to float at lower or greater offset positions as the flexible cutter bar 34 conforms to uneven ground. It will be clear that dimensions may be chosen for the more extensive committed end contacts 108, 110, such that automatic corrective response is effective throughout the total float range, even when the nominal range is shifted within its limits. Thus, at all settings, due to the particular combination of contact and brush arrangement described above, there is live response on either side of the selected dead band throughout the total (4 inch) float range.

An advantage of combining a mechanical visual range indicator with the particular selective automatic height control system of the present invention is that the operator can virtually simultaneously, as he monitors the crop-engaging portion of the harvester gathering unit, also monitor the range indicator so that he is constantly aware of the particular control range which has been selected and is in operation. He is thus, at all times, aware of his available options for adjusting the control range selectively, up or down, simply and rapidly, by manipulation of the selector switch 154, without removing his attention from the gatherer function and into the operator station to observe the particular setting of the switch 154 itself.

We claim:

1. In a crop harvester having a mobile body with an operator station and a source of electrical power and carrying a transversely extending crop gatherer vertically adjustable relative to the body and including a frame and a plurality of field surface engaging feeler elements pivotally carried by the frame and power lift means including raise and lower portions responsive to an electrical signal and operative respectively to raise and lower the gatherer relative to the body, a gatherer height control system for cooperating with the power lift means and automatically maintaining the gatherer in a selected height range relative to the field surface comprising:

a sensor switch body supported in fixed relation to the gatherer frame and having a wall;

a plurality of switch contacts mounted on the wall including a common input contact connectable to the electric power source and a plurality of substantially side-by-side spaced output contacts;

a wiper arm mechanically coupled to the feeler elements for rotational movement responsive to the movement of at least one of the feeler elements relative to the frame and carrying a connecting brush assembly, the wiper arm being operatively associated with the switch body and disposed so that as the arm moves, the connecting brush assembly while maintaining continuous engagement with the common input contact, successively connects it electrically to one or more of the output contacts; and switching means for selectively making electrically connectable at least one first output contact to the raise portion of the power lift means so as to signal it to raise the gatherer and at least one second contact to the lower portion of the power lift means so as to signal it to lower the header so as to define an operating height set point corresponding to a predetermined position of the wiper arm relative to the sensor switch body and hence of at least one of the feeler elements to the gatherer frame and relationship of the gatherer to the field surface.

2. The gatherer height control system of claim 1 wherein the spacing of the output contacts and the dimensions of the connecting brush assembly are such that said assembly may connect a pair of adjacent output contacts to the common input contact simultaneously.

3. The gatherer height control system of claim 1 wherein the output contacts selectively made connectable respectively to the raise and lower portions of the power lift means are disposed one on each side of a third contact not made so connectable so that the third contact defines a dead segment in the sensor switch corresponding to the selected operating height set point.

4. The gatherer height control system of claim 1 wherein the first and second contacts connectable respectively to the raise and lower portions of the power lift means each constitute part of first and second groups of contacts, all contacts in each of said groups being simultaneously connectable to the raise and lower portions respectively, so as to define respective raise and lower output contact segments engageable by the connecting brush assembly of the wiper arm as it moves responsive to the feeler elements.

5. The gatherer height control system of claim 4 wherein the operation of the selective switching means and the spacing of the output contacts and the dimensions of the connecting brush assembly are such that as said assembly moves within the respective raise and lower contact segments the electric power source is continuously connectable to the respective raise and lower portions of the power lift means for raising and lowering the gatherer.

6. The gatherer height control system of claim 5 wherein the selective switching means includes a manually operated multi-position switch mounted at the operator station, each position of the switch corresponding to an operating height set point of the system.

7. The gatherer height control system of claim 1 wherein the plurality of output contacts forms an elongated array and includes at its respective opposite ends, committed raise and lower contacts and the selective switching means is such that said committed contacts are connectable only to the raise and lower portions respectively of the power lift means.

8. The gatherer height control system of claim 7 wherein the array of output contacts includes a plurality of uncommitted contacts intermediate between the committed contacts and the uncommitted contacts are of substantially uniform width and the committed contacts are wider than the uncommitted contacts so as to provide for adjustment and tolerance for manufacturing variations at the opposite ends of the overall operating range.

9. In a crop harvester having a body and a source of electrical power and carrying a forward mounted gatherer including a crop handling portion having a frame and pivotally connected to the body for relative vertical movement and including a forward mounted crop engaging portion floatably connected to the frame of the crop handling portion, the floatable connection providing a range of vertical floating movement of the crop engaging portion relative to the crop handling portion and including a movable sensor element carried by the frame of the crop handling portion, the disposition of said sensor element relative to the frame being responsive to said floating movement and representative of the position of at least a portion of the crop engaging portion within its range of relative vertical movement, an improved automatic height control system for the gatherer comprising:

power lift means having raise and lower portions respectively operable, responsive to an electrical signal, to raise and lower the crop handling portion of the gatherer relative to the body of the harvester;

a position sensor switch module including:
a wiper arm carrying a connecting brush assembly and coupled directly to the sensor element for movement with it;
a switch body journalled on the wiper and held against rotation by the frame of the crop handling portion;
a contact assembly mounted in the body and carrying a plurality of contacts including a common input contact connectable with the electric power source and, spaced from it, a group of side-by-side output contacts, the contacts being disposed so as to be slidingly engageable by the connecting brush assembly with the brush assembly spanning and electronically connecting the common contact with one or more of the output contacts; and selector switching means including a manual selector switch operable to make a first output contact connectable with the raise portion of the power lift means and a second output contact connectable with the lower portion of the lift means, the disposition of said contacts thus establishing an operating height set point on either side of which the lift means is electrically signaled to raise or lower the gatherer crop handling portion responsive to vertical floating displacement of at least a portion of the crop engaging portion within a limited float range selectively established by means of the selector switching means and the relative disposition of the output contacts made connectable by manipulation of said selector switch.

10. The automatic height control system of claim 9 wherein the range of vertical movement of the crop engaging portion relative to the crop handling portion has upper and lower limits and and further including a float range indicator system including a stationary indicator element mounted on the crop handling portion, a movable indicator element mounted on the crop handling portion adjacent the stationary element for shifting movement relative thereto and connecting means operatively connecting the movable sensor element to the movable indicator element for shifting the movable indicator element relative to the stationary indicator element in response to movement of the movable sensor element so that the position of the movable indicator element relative to the stationary indicator element is indicative of the position of at least a portion of the crop engaging portion within the limited float range.

11. The automatic height control system of claim 10 wherein the manual selector switch is operable to establish a plurality of spaced operating height set points each correponding to a relative float position of the crop engaging portion within its limited float range, said plurality of operating height set points establishing, in aggregate, an automatic height control range substantially corresponding to the limited free floating range.

12. The automatic height control system of claim 11 wherein the switch body is adjustable relative to the frame of the crop handling portion so as to provide for relative shifting of the automatic control range within the limits of the free floating range.

13. In an automatic header height control system for a mobile harvester having a body and including an electric power source and carrying a pivotally mounted harvesting header having a frame and including power lift means having raise and lower portions for pivoting the header to control its operating height and a forward transversely extending crop engaging structure floatingly connected to the frame of the header for relative vertical movement, the crop engaging structure including at least one ground following feeler element for engaging and following the ground surface, a sensor transducer combination comprising:
 a rotatable sensor element carried by the header frame and connected to the crop engaging structure so that its rotational position relative to the header frame represents the relative vertical relationship of the crop engaging structure to the header frame responsive to the feeler element;
 a position sensor switch including:
  a switch body carried in a fixed relationship to the header frame;
  a plurality of contacts carried by the body and lying substantially in a common plane and including a common contact connectable with the electric power source and, spaced from it, an array of side-by-side uncommitted output contacts;
  a wiper arm assembly operatively associated with the body and coupled to the sensor element for rotational movement therewith and carrying a connecting brush assembly disposed so that movement of the wiper arm assembly moves the brush assembly in sliding engagement with the contacts, making an electrical connection between the common contact and at least one of the output contacts; and
 selector switching means including a selector switch for selectively associating respective first and second uncommitted contacts with the raise and lower portions respectively of the power lift means whereby a third uncommitted contact intermediate between said first and second contacts remains unconnectable with the power lift means, thus establishing a dead band corresponding to an intermediate portion of a selected range of operating height of the header measured in terms of the vertical relationship between the floating crop engaging structure and the header frame.

14. The sensor transducer combination of claim 13 wherein the selector switch has an off position and a plurality of on positions equal in number to the number of uncommitted output contacts so as to provide a corresponding number of operating height ranges.

15. The sensor transducer combination of claim 14 wherein the plurality of contacts further includes a pair of committed output contacts, including a raise contact and a lower contact, respectively disposed adjacent the opposite ends of the array of uncommitted output contacts and the selector switching means is operable to make the committed contacts connectable only with the raise and lower portions respectively of the power lift means so as to establish upper and lower limits of the aggregate of controlled ranges of operating heights.

16. In an automatic crop harvesting header height control system in which a sensor shaft is rotatably mounted on a header, its rotational position representative of the height of a portion of the header above a field surface and including electro-hydraulic power means for raising and lowering the header, a sensor switch comprising:
 a wiper arm assembly directly coupled to the sensor shaft for rotational movement therewith and carrying a generally radially extending connecting brush assembly, the coupling with the shaft including a cylindrical bearing journal portion engaging and concentric with the shaft;
 a switch body having an inner wall including a bearing bore for journalling the wiper arm bearing journal portion and a connector socket opening and a continuous side wall extending outwards from the inner wall and including means for engaging the header frame so as to maintain the body in a fixed rotational relationship with the header frame;
 a contact assembly carried on the inner wall and spanning the socket connector opening and including an array of spaced side-by-side output contacts and a common input contact radially spaced from the array of output contacts, all the contacts being disposed so that as the rotational position of the wiper arm assembly changes, responsive to movement of the sensor shaft, the connecting brush assembly moves in sliding engagement with the contacts so as to maintain an electrical connection between the common contact and at least one of the output contacts, the plurality of position-related discrete connection combinations provided by the sensor switch facilitating the provision of selective automatic control of header operating height in any one of a corresponding plurality of selected ranges.

17. The sensor switch of claim 16 wherein the bearing journal portion of the wiper arm assembly closes and seals the bearing bore of the switch body and the contact assembly closes and seals the connector socket opening of the switch body and further including a cover for the switch body having a continuous surface for closely engaging the sidewall of the switch body and fastener means for biasing the cover against the sidewall so as to seal the switch body, forming an enclosure for protecting the contacts and brush assembly from contamination by dust and moisture.

18. The sensor switch of claim 17 wherein the contact assembly includes a connector socket portion and, in assembly, the connector socket portion fills and extends through the connector socket opening of the body, and wherein the coupling of the sensor shaft to the wiper arm assembly includes a removable element and the wiper arm assembly includes an aperture for receiving the element, said aperture being external to the switch body so that electrical and mechanical connections to the sensor switch may be made externally and without opening the enclosure of the box.

19. The sensor switch of claim 16 wherein the means for engaging the switch body with the header frame include means for adjusting the rotational position of the switch body with respect to the header frame, thus making adjustable with respect to the header frame the set points of said plurality of selected ranges.

20. The sensor switch of claim 16 wherein the inner wall includes a raised annular boss concentric with the bearing bore and external to the body for closely fitting an aperture in the header frame and providing positional support for the box.

21. The sensor switch of claim 16 wherein the contact assembly includes a printed circuit board assembly having metallic contacts printed on a non-conducting board.

22. The sensor switch of claim 16, wherein the array of output contacts define an arc concentric with the bearing bore and includes a plurality of intermediate contacts of a first width and opposite end contacts of a second width greater than the first.

23. In an automatic gatherer height control system for a mobile harvester having an operator station and a source of electrical power and carrying a forward gathering unit pivotally attached to the harvester body and including power lift means having respective raise and lower portions operable responsive to an electrical signal to raise or lower the gatherer unit to change its operating height, the combination comprising:
- a movable sensor element carried by the gatherer unit;
- ground following mechanical means connected to the sensor element and operatively associated with the gatherer unit so that the position of said element is responsive to the height of the gatherer unit above the ground at least within a floating range defined by the ground following means;
- a first range indicator element movably carried by the gatherer unit;
- linkage means connected between the sensor element and the first range indicator element so that movement of said element relative to the gatherer unit is responsive to movement of the sensor element;
- a second range indicator element fixed to the gatherer unit adjacent the first range indicator element so that the relative positions of said indicator elements provides a visual indication of the disposition of the gatherer unit within the floating range as long as the gatherer unit is operating within that range;
- a position sensor switch including an input element coupled directly to the sensor element and a body carried in a fixed relationship to the gatherer unit and including a plurality of electrical contacts, including at least one input contact connected to the electrical power source and a plurality of output contacts, the input element including means for selectively electrically connecting the input contact to the output contacts so that the movement of the input element in unison with the sensor element results in the electrical connection of the input contact to any one or more of the output contacts; and
- selector switching means for variously and selectively connecting the output contacts to the respective raise and lower portions of the power lift system so as to signal those lift portions to raise or lower the gatherer unit as appropriate in response to movement of the sensor element whereby the gatherer unit is selectively operable in any one of a plurality of operating height ranges each range having a nominal range having an upper and a lower limit, the upper limit of the uppermost range and the lower limit of the lowermost range establishing an overall aggregate automatic height control range.

24. The combination of claim 23 wherein the aggregate automatic height control range is less than and falls within the floating range and the position sensor switch is operable throughout the floating range to signal the lift system to raise or lower the gatherer unit responsive to movement of the sensor element.

25. The combination of claim 23 wherein the position sensor switch is adjustable with respect to the gatherer unit so as to shift the aggregate automatic height control range with respect to the floating range.

* * * * *